Jan. 25, 1927.
E. R. EVANS
1,615,539
GEAR SHIFT LEVER LOCK
Filed April 5, 1923
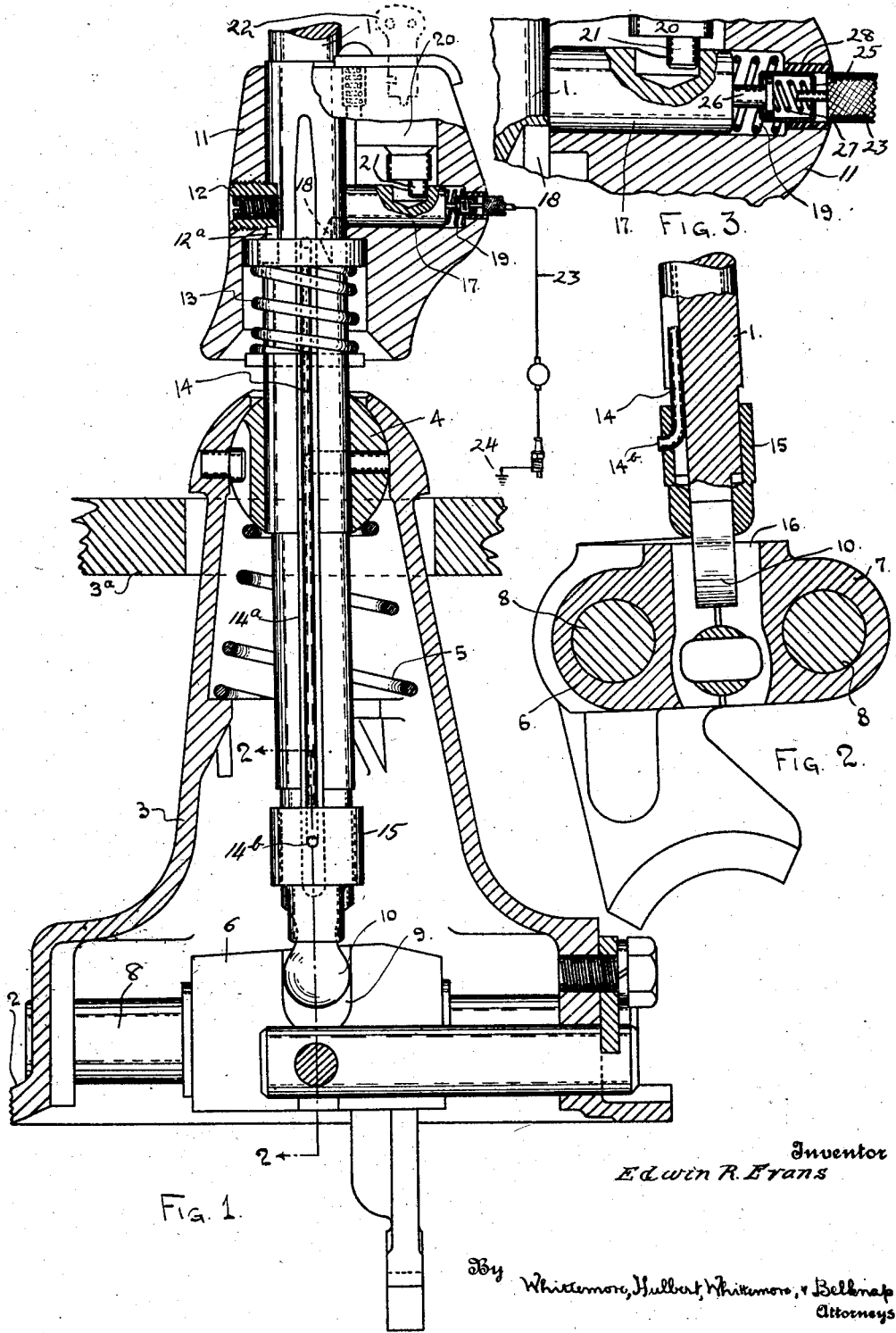
Inventor
Edwin R. Evans
By Whittemore, Hulbert, Whittemore, & Belknap
Attorneys Patented Jan. 25, 1927.

1,615,539

UNITED STATES PATENT OFFICE.

EDWIN R. EVANS, OF DETROIT, MICHIGAN.

GEAR-SHIFT-LEVER LOCK.

Application filed April 5, 1923. Serial No. 630,085.

This invention relates to locking devices for motor vehicles and particularly relates to locks acting upon the gear shift levers of such vehicles.

It is the object of the invention to exercise a control of the ignition circuit of a motor vehicle through a lock acting on the gear shift lever thereof, whereby the operator is compelled to lock the gear shift lever in order to break the ignition circuit.

In the drawings:—

Figure 1 is a vertical sectional view of the improved lock applied to a gear shift lever;

Figure 2 is a transverse sectional view thereof;

Figure 3 is a view showing the circuit controlling feature of the invention, as seen in Figure 1, but drawn to an enlarged scale.

In these views, the reference character 1 designates a gear shift lever of a motor vehicle and 2 the transmission gear casing. From said casing rises the usual hood 3 inclosing the lower end portion of said lever and projecting through the vehicle floor 3ª. The lever is universally pivoted by the engagement of a spherical journal member 4 in a bearing formed by the upper end of said hood. 5 is a spring coiled within the hood 3 and exerting upward pressure upon the journal member 4 to retain the same in the bearing portion of the hood. 6 and 7 designate a pair of gear shifter sleeves slidable upon pins 8 horizontally mounted in the casing 2. Said sleeves have their opposed faces formed with registered transverse channels 9 in which the circular lower extremity 10 of the lever 1 is selectively engageable through a rocking of the lever transversely of the vehicle. Shifting of either sleeve is effected by a rocking of the lever longitudinally of the vehicle. The description so far is that of an ordinary gear shift mechanism in common use. Upon the lever 1, slightly above the hood 3, a lock casing 11 is slidably mounted. A screw 12 radially mounted in said casing has its inner end projecting into a channel 12ª in the side of said lever, the ends of which channel are engageable by said screw to limit sliding movement of said casing. Rotation of the sleeve upon the lever is also prevented by engagement of said screw in said channel. 13 is a spring coiled upon the lever 1 beneath the casing 11 and urging the latter to its uppermost limiting position. 14 is a stem downwardly extending from the casing 11 within a groove 14ª in the lever 1, said stem and the casing 11 forming a unit as regards sliding movement. The lower end of the stem 14 is outwardly bent as indicated at 14ᵇ and engages a head 15 slidable upon the lower portion of the lever. When the casing 11 and stem 14 are depressed, the head 15 is shifted by said stem into the space 16 between the two sleeves 6 and 7 so as to lock the lever 1 against the transverse movement requisite for shifting the lever 1 from its normal neutral position. 17 is a locking bolt slidable radially in the casing 11 and adapted in the depressed position of said casing to register with a socket 18 formed in said lever. A coiled spring 19 exerts inward pressure on said bolt so as to enter the latter in said socket upon depression of the casing 11. 20 indicates the barrel of an ordinary lock which is mounted in the upper portion of the casing 11 and which is adapted to act through a pin 21 upon the bolt 17 to retract the latter. An ordinary key 22, such as is indicated in dash lines in Figure 1, serves to actuate the lock 20. 23 designates the ignition circuit grounded at one point to the engine, as is indicated at 24; the other ground of said circuit is under control of the lock 20 as will now be described. Thus, the circuit wire 23 enters the casing 1 in alignment with the bolt 17 and a collar 25, in electrical contact with said wire, also has constant electrical contact with a plunger pin 26 which is urged into contact with the bolt 17 by a spring 27 coiled within said collar 25. The arrangement is such, however, that when said bolt is projected to enter the socket 18, contact is broken between the plunger pin 26 and the bolt since the collar 25 affords said pin only a very limited reciprocation. 28 designates insulation, preventing contact between the wire 23 and the connected collar 25 and the casing 11.

From the preceding description it will be evident that when the casing occupies its normal raised position, contact is established between the bolt 17 and pin 26 to close the ignition circuit. When, however, the casing 11 is depressed to its locking position causing a projection of the bolt 17 into the socket 18, the ignition circuit is broken between said bolt and said plunger pin. Consequently, when the operator of a motor vehicle equipped with the described locking device is about to leave the vehicle, he is prevented from beaking the ignition circuit for the purpose of stopping the engine until he has locked the vehicle by depressing the casing 11. Thus, the operator in leaving the vehicle is prevented from neglecting to lock the same due to carelessness or forgetfulness.

It is to be understood that the automatic control of the ignition circuit above described eliminates necessity for the usual ignition switch upon the instrument board.

What I claim as my invention is:—

1. The combination with a gear shift lever of a motor vehicle, of a locking element for said lever slidable longitudinally of said lever between a lowered locking and a raised non-locking position, a casing slidable upon the lever and having an actuating connection with said locking element, a bolt slidable in said casing transversely to said lever and engageable in the lowered position of the casing with a shoulder of said lever to maintain said position, and means associated with said casing closing the ignition circuit in the raised position of the casing and breaking said circuit when the casing is lowered.

2. The combination with a gear shift lever, of a locking element for said lever vertically slidable thereupon between a raised non-locking position and a lowered locking position, and means controlled by said element closing the ignition circuit of the vehicle in the raised position of said element and breaking said circuit in the lowered position of said element.

3. The combination with a gear shift lever of a motor vehicle, of locking means for said lever slidable thereupon between a raised non-locking position and a lowered locking position, a spring normally maintaining the raised position of said element, a bolt carried by said element for engagement with a shoulder of said lever, a spring for projecting said bolt into engagement with said shoulder in the lowered position of said element, and means controlled by said bolt closing the ignition circuit in the retracted position of the bolt and breaking said circuit upon projection of said bolt.

4. The combination with a gear shift lever of a motor vehicle, of a lock mechanism bodily slidable longitudinally of said lever between a lowered locking and a raised non-locking position, an ignition circuit, and means for automatically breaking said ignition circuit upon lowering of said locking mechanism.

5. In a device of the character described, a gear shift lever, a lock casing slidable longitudinally thereof, means for locking the gear shift lever in one position of the casing, a bolt carried by said casing and slidable therein, transversely to the direction of sliding of said casing, an ignition circuit normally including said bolt, and means for moving the bolt to break the circuit upon movement of the casing.

In testimony whereof I affix my signature.

EDWIN R. EVANS.